United States Patent [19]
Keith et al.

[11] 3,716,733
[45] Feb. 13, 1973

[54] ELECTRIC MOTOR WITH CORRUGATED PLASTIC PROTECTIVE COVERING ON THE LEAD WIRES

[75] Inventors: M. Robert Keith, St. Louis, Mo. Richard C. Barnes, Indianapolis, Ind.

[73] Assignee: Stone Industrial Corporation, College Park, Md.

[22] Filed: Feb. 2, 1972

[21] Appl. No.: 222,891

[52] U.S. Cl. ...................... 310/71, 138/121, 174/18, 174/136, 174/167
[51] Int. Cl. ......................... H02k 5/00, H01b 17/58
[58] Field of Search ..... 174/18, 110 PM, 110 D, 136, 174/138 R, 151, 152 R, 152 G, 167; 138/121, 122; 310/43, 71, 85, 87, 88

[56] References Cited

UNITED STATES PATENTS

| | | | |
|---|---|---|---|
| 2,897,603 | 8/1959 | Behrman | 138/121 X |
| 3,135,885 | 6/1964 | Maynard | 310/87 |
| 3,219,857 | 11/1965 | Fisher | 310/71 |
| 3,344,291 | 9/1967 | Pratt | 310/43 X |

FOREIGN PATENTS OR APPLICATIONS

| | | | |
|---|---|---|---|
| 1,192,584 | 5/1965 | Germany | 310/71 |

*Primary Examiner*—Laramie E. Askin
*Attorney*—Stepno & Neilan

[57] ABSTRACT

Electrical lead wires, for example, from the stator of a hermetically sealed electric motor to a junction box are encased in a corrugated sheath of polyethylene terephthalate. The corrugations effectively increase the spacing between the primary insulation on the lead wires and regions of potential insulation abrasion and wear on the stator laminations or the compressor casing.

7 Claims, 4 Drawing Figures

PATENTED FEB 13 1973 3,716,733

ELECTRIC MOTOR WITH CORRUGATED PLASTIC PROTECTIVE COVERING ON THE LEAD WIRES

BACKGROUND OF THE INVENTION

The present invention relates to protective coverings for electrical wires, and more particularly to protective coverings for lead wires extending from motors, especially hermetic motors, to an electrical power source.

Hermetic motors utilized in air conditioners, refrigerators, freezers, and similar appliances are built as an integral part of the compressor. The electric motor stator is sealed inside the compressor housing which necessitates bringing insulated lead wires from the stator out through the housing for connection to an electrical power source. These lead wires are insulated, usually with a woven polyester or cotton covering. These insulation coverings are subjected to internal and/or external sources of abrasion, e.g., abrasion and wear against the stator laminations or against the compressor housing due to vibrations of the apparatus. If the insulation wears through, the electrically charged lead wires become grounded to the compressor housing and to the appliance to which the compressor is attached. If the appliance is not connected to a grounded, three-wire outlet, it is electrically "hot" and is potentially lethal to anyone touching it.

The hazards of this potentially dangerous situation have long been recognized by appliance manufacturers. In order to minimize the danger, various protective coverings have been used to protect the insulated lead wires from abrasion. Thus, resort has been made to enclosing lead wires in tubes made of polytetrafluoroethylene or silicone rubber. While such prior devices have been reasonably satisfactory, they have some serious drawbacks. For example, polytetrafluoroethylene is expensive and is not considered flexible enough to conform to the bends and curves in lead wires. Silicone rubber is also expensive and, when subjected to the mineral oil and refrigerant gas environment present in the compressor, it tends to swell and crack over long periods of time.

The art is also aware of spirally wound tubes of polyethylene terephthalate which has properties compatible with a mineral oil refrigerant gas system. However, such spirally wound tubes lack flexibility and conformability. Thus, there is a recognized need for improved protectors for lead wires.

SUMMARY OF THE INVENTION

It is a primary object of the present invention to provide improved, economical protectors for electrical lead wires.

Another object of the present invention is to provide a lead wire with a corrugated protective covering made of a plastic material which is compatible with the environment in which the covering will be utilized.

The objectives of the invention are achieved by encasing lead wires, especially lead wires from a hermetic motor, in thin walled corrugated polyethylene terephthalate (Mylar) tubes which loosely fit around the primary insulation covering the conductor wire.

For purposes of illustration, the invention will be described as embodied in a combination with an hermetically sealed compressor in which there is a refrigerant gas such as one of the Freons and a mineral oil. The electric motor stator is sealed within the compressor housing, and the lead wires pass from the stator coils through an opening in the compressor housing to a conventional electric power source. Typically, the lead wires are curved and the corrugations in the protective coverings accommodate this curvature by allowing the coverings to bend and conform to the curvature of the lead wires.

A further significant advantage of the use of the corrugated covering is that the corrugations space the outer surface of the insulation around the conductor from the compressor housing and other surfaces which might abrade the insulation. This spacing or stand-off is equal to the radial distance between a peak to a trough of the corrugations, i.e., is equal to the height of one of the corrugations. Stated differently, the corrugations effectively increase the wall thickness from the order of several mils, which is the thickness of the corrugated tube, to in the order of ⅛ inch which is the height of one of the corrugations. Therefore, even if abrasion wears a hole in a corrugated covering, the insulated lead wire is still spaced away from the point of abrasion, thereby preventing abrasion from wearing through the primary insulation on the lead wire.

It is conventional to seal oil into the compressor housing to provide for lubrication of the moving parts. Thus, everything within the compressor housing including the protective corrugated covers is constantly splashed with oil and must resist attack from the oil. Some compressors utilize pumps to circulate the oil and others rely on splashing the oil. In use, oil will probably enter at the gap at an end of the protector and may even fill the region between the outer insulation on the lead wires and the corrugated covering. This is advantageous since mineral oil is an excellent electrical insulator and thus provides further protection against possible grounding of the lead wire to the compressor housing. Since the insulated lead wires are held away from the point of abrasion by the corrugated covers; in the event that a hole is worn in a cover a greater volume of oil may enter and concentrate in the region of the hole.

While the invention has particular utility when used in conjunction with hermetic motors, it may be utilized in any system in which a protective covering for lead wires is desired, for example, in sealed submersible motors, sealed explosion-proof motors, etc.

DETAILED DESCRIPTION OF THE INVENTION

Figure 1:
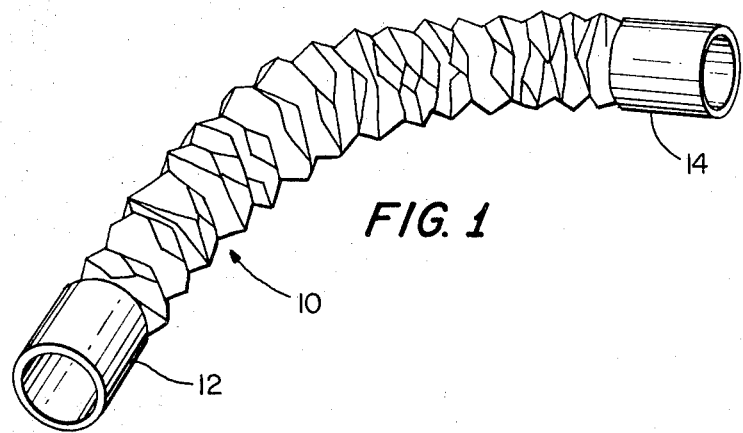
FIG. 1 is a perspective view of a corrugated lead wire covering in accordance with the present invention.

Referring now to the drawings, reference numeral 10 generally designates the lead wire protective covering of the present invention which includes smooth tubular end sections 12, 14 at opposite ends of the flexible main section which is comprised of a corrugated thin wall tubing having corrugations indicated by reference numeral 16. The outer peaks of the corrugations have approximately the same outside diameter as the uncorrugated tubular end sections 12, 14. The protective covering 10 is preferably made of polyethylene terephthalate tubing or other plastic film suitable for hermetic motor use of small wall thickness, for example, in the order of a few mils, preferably about 0.005 inch.

Figure 2:
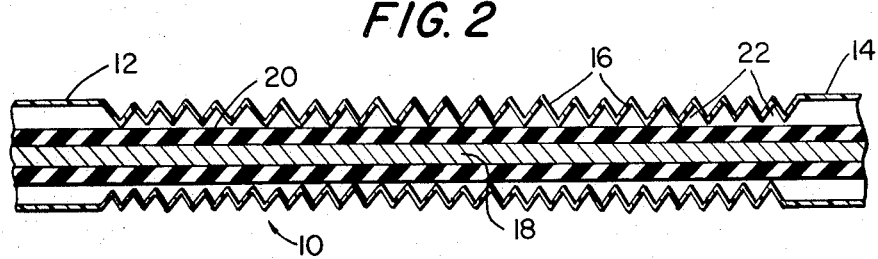
FIG. 2 is a longitudinal sectional view showing a covering of the invention surrounding a lead wire.

Referring to FIG. 2, the corrugated covering 10 is shown in operative position around lead wires comprised of a central bundle of conductors 18 and an insulation layer 20 surrounding the conductors. As is apparent from this view, there are voids 22 between the insulation layer 20 and the inner surfaces of the corrugations 16. The corrugations space the insulation layer from possible sources of abrasion. The spacing between such possible sources of abrasion and the insulation layer 20 is equal to the distance from the outer surface of insulation layer 20 to the outermost tips of corrugations 16, i.e., is equal to the radial distance between the peak of one corrugation and the trough of the adjacent corrugation.

Figure 3:
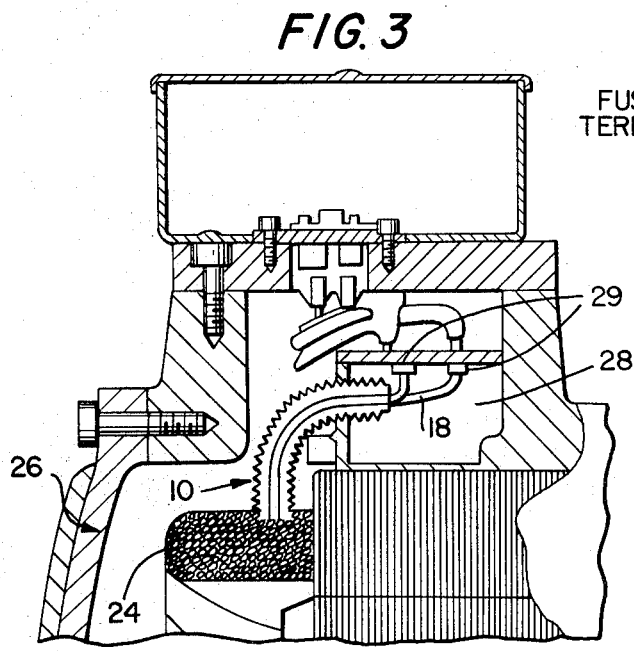
FIG. 3 is a cross-sectional view of a portion of a compressor unit of a vapor compression refrigeration cycle showing a corrugated protective covering of the invention in operative position within the compressor housing.

FIG. 3 illustrates a typical application of the invention in use within an open type refrigeration unit utilizing castings. In this view, the coils of an electric motor stator 24 are located within a compressor housing 26 with the lead wires encased in the covering 10 extending from the stator to a junction box 28. Inside the junction box, the conductors 18 extend beyond the covering 10 and are each connected to separate terminals 29. As will be understood by those skilled in the art, the stator 24 is sealed inside the compressor housing, and a refrigerant gas, typically one of the Freons, flows into one end of the compressor housing, around the stator 24 and from there into a compressor cylinder where it is compressed and then passed out of the compressor for recycle in the refrigeration unit. Therefore, all of the items within the compressor housing including the protective covering 10 are contacted by the Freon gas and are subject to possible attack by the Freon. Similarly, oil is sealed in the compressor housing to provide lubrication for the moving parts. A conventional oil splasher or a pump (not shown) saturates everything within the compressor housing and therefore the covering 10 must also resist attack from the oil. Polyethylene terephthalate which is the preferred material for making the corrugated protective covering of the invention is economical and possesses suitable resistance to attack by both Freon and mineral oil. Since the covering fits loosely around the conductors 18, the mineral oil may enter and partially or more likely completely fill the gap between these parts and advantageously act as additional electrical insulation.

By virtue of the corrugations, the effective spacing between insulation around the conductor wires and possible sources of abrasion such as the part of the compressor housing 26 adjacent the covering is not merely the thickness of the protective covering 10; but rather the effective spacing is equal to the distance from the insulation layer 20 to the outermost peaks of corrugations 16, which distance hereinafter will be referred to as the height of the corrugations. By way of example, if the thickness of the tubing is about 0.005 inch, and the height of the corrugations is about one-eighth of an inch or 0.125 inch, there is a 25-fold increase in the spacing of the insulation 20 from sources of possible abrasion due to the corrugations. In effect, the corrugations effectively increase the wall thickness from 0.005 to 0.125 inch as regards spacing the insulated conductors from sources of abrasion. In this fashion, even if in time abrasion should wear a hole in the corrugations 16, the insulated lead wires are still spaced from the point of abrasion by the height of the corrugations which, as indicated above, may be about one-eighth of an inch, thereby preventing the insulation from wearing through the primary insulation 20 on the conductors 18.

Figure 4:
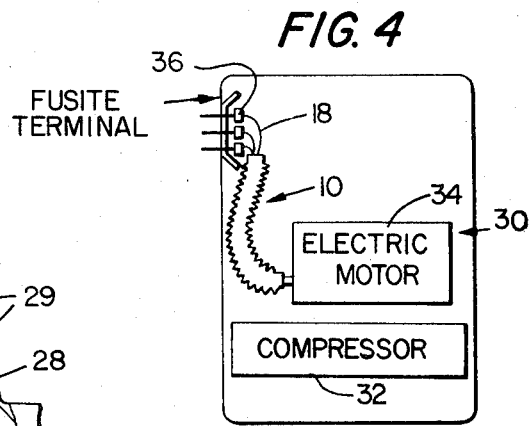
FIG. 4 is a cross-sectional view of another refrigeration unit employing the protective covering of the invention.

FIG. 4 illustrates another embodiment of the invention in which the covering 10 encases the lead wires of a hermetically sealed refrigeration unit 30 of the welded metal can type which includes a compressor 32, and an electrical motor 34, which has its lead wires 18 connected to terminals 36.

In installations in which lubricating oil is circulated over the parts including the protective covering of the invention, in the event that abrasion wears a hole in one of the corrugations, additional lubricating oil may enter this hole and provide further protection from grounding since mineral oil is an excellent insulator.

It will be appreciated that the above-mentioned dimensions for the wall thickness of the covering 10 and for the height of the corrugations 16, while presently preferred, are for purposes of illustration only and are not intended to limit the invention. Also, it will be appreciated by those skilled in the art that while the corrugations 16 in FIG. 2 are all illustrated as being the same size and substantially symmetrical; in actual practice the corrugations will not exhibit such uniformity.

The corrugations in the covering 10 may be formed by known procedures. However, it has been found that it is necessary to heat set the corrugations when using a plastic such as polyethylene terephthalate which exhibits memory properties when exposed to heat. Since the protective coverings will be used in environments in which elevated temperatures may occur, in the absence of heat setting, the corrugations might be dissipated with time. The heat setting operating conditions can be varied. In any event, the temperature should be a minimum of 50° F. above the indented use temperature. The time of heat exposure should be sufficient to allow the mass to attain heat set temperature. The time required for heat setting varies with the temperature but in any event is quite short and for thin walled tubing is almost instantaneous at temperatures of about 300° F.

White the invention has been described primarily with regard to use with hermetic motors in a Freon gas mineral oil environment; the invention may be utilized in other types of motors such as sealed submersible motors, sealed explosion-proof motors, and actually any type of motor. At the present time economic factors prevent manufacturers from providing lead protectors on all motors; however, the current trend toward increased consumer protection could very well eventually result in universal use of lead protectors on all types of motors. When used in motors which do not have the Freon gas mineral oil environment, it is contemplated that other materials than the illustrative polyethylene terephthalate may be utilized in forming the corrugated protector of the invention.

While the presently preferred embodiment of the invention has been shown and described with particularity, it will be appreciated that various changes and modifications may readily suggest themselves to those of ordinary skill in the art upon being apprised of the present disclosure. It is intended to encompass all such changes and modifications as fall within the scope and spirit of the appended claims.

What is claimed is:

1. In an apparatus having an electric motor stator, a source of electric power, and at least one lead wire connecting the stator to the source of electric power, said lead wire having an outer insulation layer, the improvement comprising a flexible corrugated plastic covering surrounding the insulation layer of said lead wire, the corrugations of said covering having a height appreciably greater than the wall thickness of said covering and serving to space the insulation layer of the lead wire from sources of possible abrasion.

2. An apparatus according to claim 1, wherein said electric motor stator is disposed within a compressor housing, and wherein said covering is exposed to and is compatible with a refrigerant gas and a mineral oil within said compressor housing.

3. An apparatus according to claim 2, wherein said covering is made of polyethylene terephthalate.

4. An apparatus according to claim 3, wherein voids are provided between the outer surface of the insulation layer of the lead wire and the inner surfaces of the corrugations, and further comprising mineral oil in said voids to function as an electrical insulating medium therein.

5. An apparatus according to claim 1, wherein the corrugations in said covering are heat set.

6. Apparatus according to claim 5, wherein said covering is made of polyethylene terephthalate.

7. Apparatus according to claim 6, wherein the wall thickness of said covering is in the order of about 0.005 inch, and wherein the height of the corrugations is in the order of about 0.125 inch.

* * * * *